United States Patent
Anderson

(10) Patent No.: US 7,837,965 B2
(45) Date of Patent: Nov. 23, 2010

(54) PROCESS TO REMOVE HYDROGEN-SULFIDE FROM GAS BY REFLUX RECYCLE FROM SOUR WATER STRIPPER

(75) Inventor: Mark C. Anderson, Spring, TX (US)

(73) Assignee: Thiosolv, LLC, Spring Branch, TX (US)

( * ) Notice: Subject to any disclaimer, the term of this patent is extended or adjusted under 35 U.S.C. 154(b) by 133 days.

(21) Appl. No.: 12/316,152

(22) Filed: Dec. 10, 2008

(65) Prior Publication Data

US 2009/0148373 A1    Jun. 11, 2009

(51) Int. Cl.
- B01D 53/52 (2006.01)
- B01D 53/86 (2006.01)
- B01D 53/14 (2006.01)
- C01C 1/00 (2006.01)
- C01C 1/20 (2006.01)

(52) U.S. Cl. ............ 423/234; 423/210; 423/220; 423/222; 423/243.01; 423/243.02; 423/243.06; 423/352

(58) Field of Classification Search ........ 423/210, 423/220, 222, 234, 243.01, 243.02, 243.06, 423/352
See application file for complete search history.

(56) References Cited

U.S. PATENT DOCUMENTS

| | | | |
|---|---|---|---|
| 3,383,173 A * | 5/1968 | Bollen ............ 423/234 |
| 4,321,241 A | 3/1982 | Bechthold | |
| 4,440,650 A | 4/1984 | Watson et al. | |
| 4,968,488 A | 11/1990 | Spevack | |
| 6,217,839 B1 | 4/2001 | Hess et al. | |
| 6,289,988 B1 | 9/2001 | Myers et al. | |
| 6,365,099 B1 | 4/2002 | Castrantas et al. | |
| 6,383,261 B2 | 5/2002 | Myers et al. | |
| 6,534,030 B2 | 3/2003 | Anderson et al. | |
| 6,759,018 B1 | 7/2004 | Arno et al. | |
| 7,052,669 B2 | 5/2006 | Schoubye et al. | |
| 2006/0165575 A1 | 7/2006 | Bassi et al. | |

OTHER PUBLICATIONS

Visscher et al., "Atmospheric Chemistry in Giant Planets, Borwn Dwarfs, and Low-mass Dwarf Stars. II. Sulfur and Phosphorus." The Astrophysical J., 648:1181-1195 (Sep. 2006).*

* cited by examiner

*Primary Examiner*—Stuart Hendrickson
*Assistant Examiner*—Daniel Berns
(74) *Attorney, Agent, or Firm*—D'Ambrosio & Menon, LLP; Jo Katherine D'Ambrosio; Usha Menon

(57) ABSTRACT

A process for reducing hydrogen sulfide from a gas comprising contacting the gas with an aqueous scrubbing liquid recycled from a sour water stripper. The aqueous scrubbing liquid comprises ammonia. The contacting of the gas with the aqueous scrubbing liquid thereby produces a semi-sweet gas with reduced concentration of hydrogen sulfide and a rich liquid solution.

21 Claims, 3 Drawing Sheets

PROCESS TO REMOVE HYDROGEN-SULFIDE FROM GAS BY REFLUX RECYCLE FROM SOUR WATER STRIPPER

BACKGROUND OF THE INVENTION

The most common processes for removing sulfur compounds from petroleum fractions involve treating the oil with hydrogen at moderate pressures (200-300 psi) and moderate temperatures (400°-800° F.) in the presence of a suitable solid catalysts in one or more reactors, processes collectively referred to as hydrotreating. The process converts the sulfur in the hydrocarbon compounds to hydrogen sulfide ($H_2S$).

Hydrogen sulfide can be removed from a gas stream by a variety of processes. One process to remove $H_2S$ from a gas stream is to use liquid-phase oxidation. Alternatively, the $H_2S$ may be dissolved in a liquid in which the other compounds of the gas stream are much less soluble than the $H_2S$ based on either their physical properties or their alkalinity.

SUMMARY

Embodiments of the present invention generally include a process for the reduction of $H_2S$ from a gas. In one or more embodiments, the gas scrubbing system uses the ammonia in the scrubbing liquid recycled from a sour water stripper to reduce the concentration of $H_2S$ in the treated gas. In one embodiment, this process occurs while maintaining the overall molar ratio of ammonia supplied to $H_2S$ removed at a value less than one. The resulting aqueous solution can then be stripped to remove both ammonia and $H_2S$ as a vapor product.

In one embodiment, the process comprises contacting in a first contact zone the feed gas with aqueous scrubbing liquid comprising cooled liquid from a reflux drum of a sour water stripper, the cooled liquid comprising aqueous ammonia and hydrogen sulfide, producing a semi-sweet gas stream with a lower concentration of $H_2S$ than the feed gas and a rich liquid solution. In another embodiment of the invention, the feed gas stream further comprises carbon dioxide.

In another embodiment, the rich liquid solution is mixed with overhead vapor from a sour water stripper, creating a mixture. One embodiment comprises controlling the temperature of the mixture to prevent condensation of ammonium containing compounds within the mixture by adjusting the rate of heat removed from the overhead vapor prior to combining it with the rich liquid. In one specific embodiment, the temperature of the mixture is controlled to prevent the condensation of ammonium bisulfide.

Also, one or more embodiments of the invention include separating the mixture in the reflux drum, to produce a vapor product stream and a flashed liquid. In this embodiment, the vapor product stream is released or exits from the reflux drum. A portion of the flashed liquid may be passed to a means of cooling to produce the aqueous scrubbing liquid, and another portion of the flashed liquid may be returned to the sour water stripper as reflux. This embodiment comprises splitting the flashed liquid into two streams, the aqueous scrub solution stream and a sour water reflux stream. Additionally, this embodiment may further comprise feeding the sour water reflux stream into the sour water stripper.

Another alternative embodiment of the invention, controlling the temperature of the mixture further comprises adjusting the rate of heat removed from the overhead vapor prior to mixing with the rich liquid solution. Alternatively, controlling the temperature of the mixture may comprise adjusting the temperature of the rich liquid prior to mixing with the overhead vapor from the sour water stripper.

In one or more alternate embodiments, ammonia may be added to the first contact zone or to the aqueous scrubbing liquid before it enters the first contact zone. The ammonia addition may be adjusted according to the pH of liquid in the aqueous scrubbing liquid. Alternatively, the addition of ammonia may be adjusted according to the ratio of the concentrations of ammonia to hydrogen sulfide in the vapor product stream. Another embodiment comprises measuring the concentration of hydrogen sulfide in the semi-sweet gas and adjusting the flow rate of ammonia added to the first contact zone or to the aqueous scrubbing liquid in response to the measured concentration of hydrogen sulfide.

Another embodiment comprises contacting the semi-sweet gas and wash water in a second contact zone, producing a sweet gas with reduced concentration of $H_2S$ compared to the semi-sweet gas and a rich water wash stream. In one embodiment, the wash water is stripped sour water from the sour water stripper.

In another embodiment, ammonia is added to the second contact zone. The rate of ammonia addition may be adjusted according to the pH of liquid in the second contact zone. Another embodiment comprises measuring the concentration of hydrogen sulfide in the sweet gas and adjusting the rate of addition of the ammonia to the second contact zone in response to the concentration of hydrogen sulfide.

In an alternative embodiment, the total amount of ammonia added to the first contact zone plus the second contact zone is less than one mole of ammonia per mole of hydrogen sulfide removed from the feed gas in the first contact zone and the second contact zone. In this specific embodiment, the concentration of hydrogen sulfide in the sweet gas may be less than 100 parts per million.

In one embodiment, the rich water wash stream is fed to the first contact zone. In this or another embodiment, the rich water wash stream is fed to the sour water stripper. The temperature of the wash water may be controlled to maintain it to be a temperature within a range from 0° to 30° F. higher than the temperature of the semi sweet gas from the first contact zone.

Yet another embodiment comprises contacting the sweet gas with a solution comprising ammonium sulfite and ammonium thiosulfate in a third contact zone to reduce the concentrations of hydrogen sulfide and ammonia in the sweet gas.

DETAILED DESCRIPTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

Figure 1:
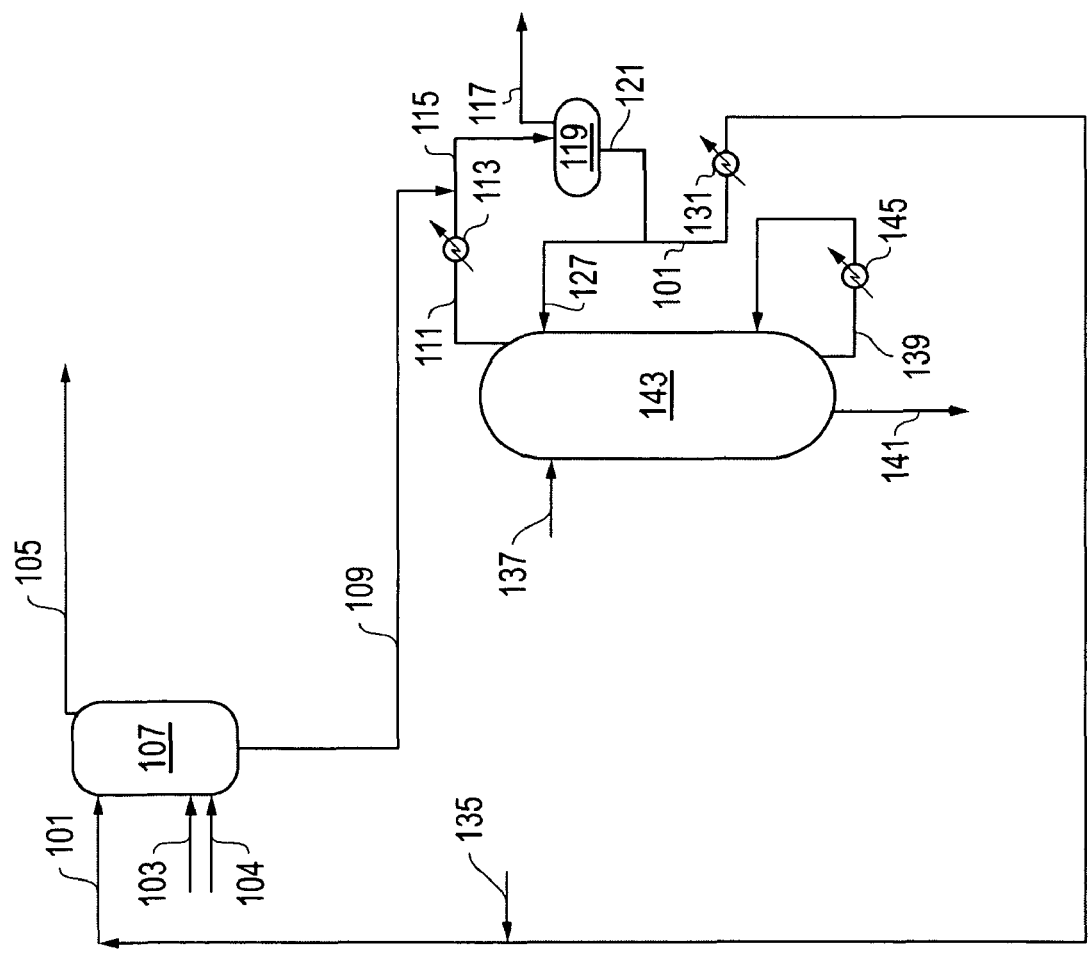
FIG. 1 is a schematic diagram of one embodiment of the process.

FIG. 1 illustrates a specific, non-limiting embodiment, illustrating a process for removing hydrogen sulfide from a gas. In this embodiment, a sour feed gas 103 comprising $H_2S$ is fed to a first contact zone 107, where it is contacted with a aqueous scrubbing liquid 101 from the reflux drum 119 of a sour water stripper 143. In another embodiment, the feed gas stream 103 may further comprise carbon dioxide. The aqueous scrub solution 101 must be cooled prior to entering the first contact zone 107. In one embodiment, the aqueous scrub solution may be cooled to below about 120° F. prior to entering the first contact zone. The first contact zone 107 may consist of various embodiments, including a column or any other device capable of contacting a liquid with a gas to facilitate mass transfer between the phases.

As shown in FIG. 1, an ammonia feed stream 135 may be added to the aqueous scrubbing liquid stream 101 prior to entering the first contact zone 107. In an alternative embodiment, an ammonia feed stream 104 may be used to add ammonia directly to the first contact zone 107. The additional ammonia increases the ammonia/hydrogen sulfide ratio in the first contact zone 107, which in turn increases the fraction of hydrogen sulfide removed from the sour gas 103 in the first contact zone 107. The ammonia feed streams 135/104 may be controlled by the operator and/or the controller in response to the concentration of $H_2S$ in the semi-sweet gas 105 or to the ratio of ammonia to $H_2S$ in the sour water stripper gas 117. In one embodiment, the amount of ammonia added may be in response to a measurement of the pH of the aqueous scrubbing solution 101, the sour water stripper 143 or the first contact zone 107.

In one specific aspect of the invention, the flow rate of scrubbing liquid 101 is controlled so that the molar flow rate of ammonia within the aqueous scrubbing liquid 103 plus the molar flow rate of an ammonia feed stream 135/104 exceeds the molar flow of $H_2S$ in the scrub solution 103 by more than the molar flow of $H_2S$ in the sour feed gas 103. The molar excess of ammonia in the scrubbing liquid 101 can cause a portion of the $H_2S$ from the gas 103 to dissolve in the scrubbing solution in the first contact zone 107, which may result in the rich liquid being enriched with $H_2S$ while the semi-sweet gas 105 is depleted of $H_2S$.

In one embodiment, the transfer of $H_2S$ from the feed gas 103 to the scrubbing liquid 101 in the first contact zone 107 produces a semi-sweet gas 105 and a rich liquid solution 109. In another embodiment, the semi-sweet gas 105 produced contains a reduced concentration of hydrogen sulfide and a concentration of ammonia vapor approximately in equilibrium with the reflux recycle liquid at the temperature of the first contact zone 107. The rich liquid solution 109 may contain the $H_2S$ removed from the feed gas 103 in addition to the $H_2S$ and some or most of the ammonia in scrub solution 101.

In still another embodiment, the rich liquid solution 109 leaving the first contact zone 107 is mixed with the overhead vapor stream 111 from a sour water stripper 143 upstream of sour water stripper condenser 113 or with the partially-condensed stream 111 downstream of the condenser 113. In this embodiment, the combination of the vapor stream 111 and the rich liquid solution 109 creates a mixture 115. In one embodiment, the energy required to heat the rich liquid 109 to the temperature of the reflux accumulator and to flash out the $H_2S$ absorbed in first contact zone 107 may be provided by the condensation of part of the sour water stripper overhead vapor, energy which in a standalone stripper processing the same sour water feed 137 would be rejected to atmosphere to condense liquid for reflux. In another embodiment, the rich liquid solution 109 leaving the first contact zone 107 is preheated by heat exchange with other process streams (not shown) before mixing with stream 111.

In one or more aspects, the temperature of the mixture 115 entering the reflux drum 119 is controlled by adjusting heat removal in the condenser 113. In one embodiment, the temperature of the mixture 115 may be controlled in order to prevent the condensation of ammonium containing compounds. In this embodiment, the temperature of the mixture 115 may be controlled in order to prevent the condensation of ammonium bisulfide. In one specific aspect of this invention, the temperature is controlled to attain a mixture temperature of about 170° to 190° F. However, it should be appreciated that the temperature of the mixture 115 may be controlled by the use of a heat transfer device (not shown), adjusting the temperature of the mixture 115 stream before it enters the reflux drum 119, or by a heat transfer device (not shown), adjusting the temperature of the rich liquid solution 109 exiting the first contact zone 107 before mixing with the overhead vapor 111, or any combination thereof.

In one embodiment, the mixture 115 separates in the reflux drum 119 forming a liquid and a vapor phase. In one embodiment, the ratio of ammonia to $H_2S$ in the liquid in the reflux drum 119 is greater than the ratio of ammonia to $H_2S$ in the product gas 117, with which it is in equilibrium. In another embodiment, the vapor phase may be released as the overhead product stream 117 of the sour water stripper 143. In this embodiment, the product stream 117 may be referred to as sour water stripper gas. In yet another embodiment, the flashed liquid 121 released from the reflux drum 119 may divide into two streams. Here, one stream may consist of sour water reflux 127 and may be added to the sour water stripper 143. The second stream may consist of the aqueous scrub solution 101. In another embodiment, the aqueous scrub solution may be cooled by a heat exchanger 131 prior to entering the first contact zone 107.

In one embodiment, a sour water feed 137 may be fed into the upper portion of the sour water stripper 143. In another specific, non-limiting embodiment, the sour water feed 137 enters the sour water stripper 143 approximately three trays from the top, providing a rectifying section between the feed point and the overhead section. In yet another embodiment, heat is transferred to the liquid 139 at the bottom of the sour water stripper 143 in reboiler 145 to generate vapor to flow countercurrently to the liquid descending in the distillation column of the sour water stripper 143. The rising vapor may strip ammonia and $H_2S$ from the descending sour water so that the liquid reaching the bottom of the stripper, referred to as stripped sour water, is depleted of both ammonia and $H_2S$.

In a specific, non-limiting embodiment, the aqueous scrubbing liquid 101 recycled from the sour water stripper 143 may be used as a sole source of ammonia to the first contact zone 107. This accomplishes efficient, economical, and environmentally friendly removal of hydrogen sulfide from a gas because no new ammonia is required to be purchased to add to the system.

Figure 2:
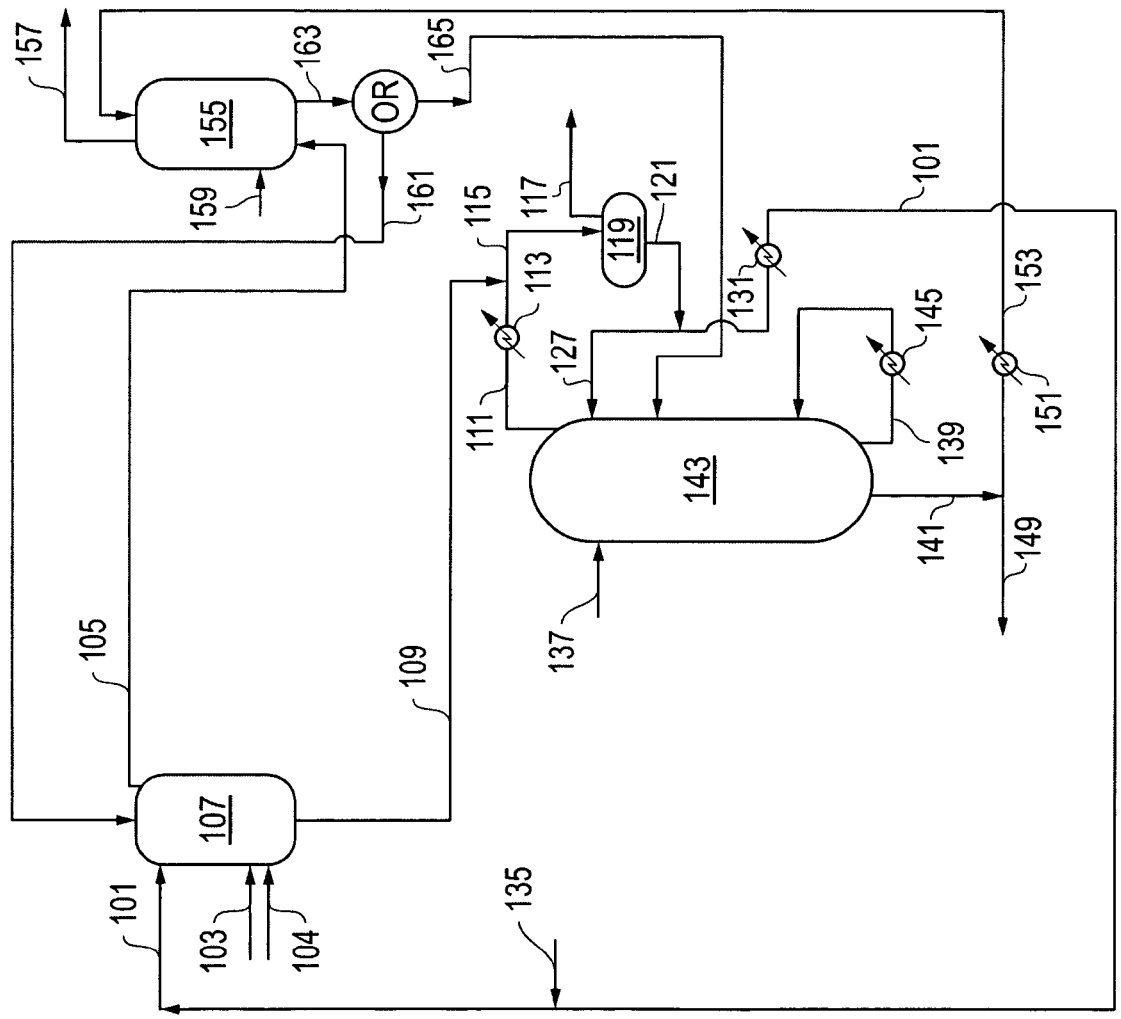
FIG. 2 is a schematic diagram of another embodiment of the process.

In another aspect of the invention, the water stream 141 leaving the bottom of the sour water stripper 143 comprises reduced concentrations of $H_2S$ and ammonia in comparison to the concentrations of H$_2$S and ammonia in the sour water feed 137. FIG. 2 illustrates another embodiment in which the water stream 141 from the sour water stripper 143 may be split into two streams, a first stream 149 and a second stream 153. In yet another aspect, the first stream 149 is net stripped water that exits the system to either be disposed or reused in other areas of the process plant for various functions. The amount of water exiting the system in the first stream 149 may be adjusted to control the internal liquid level of the sour water stripper 143. In another aspect, the wash water 153 may be fed into the second contact zone 155. In one embodiment, the flow rate of wash water 153 may be small compared to the flow of the sour water feed 143.

In an alternate embodiment of the invention, shown in FIG. 2, further processing involves a second contact zone 155 to further remove H$_2$S and ammonia from the semi-sweet gas 105. In one specific, non-limiting embodiment, the second contact zone 155 is an upper section of the same vessel where the first contact zone 107 is the lower section. In another embodiment, the semi-sweet gas 105 is fed into the second contact zone 155. In one or more embodiments, the second contact zone 155 provides for contact between a liquid phase and a vapor phase in order to facilitate mass transfer between the liquid phase and the vapor phase.

In one embodiment, a stream of wash water 153 containing little or no ammonia is fed into the top portion of the second contact zone 155. In another embodiment, as shown in FIG. 2, the wash water 153 fed into the second contact zone 155 is a portion of the stripped water stream 141 exiting the sour water stripper 143. The stripped water stream may be cooled in heat exchanger 159. In one aspect of the invention (not shown), the stripped water may be first cooled by heat exchange with rich liquid 109. In another embodiment, the temperature is controlled within a range of 0° to 30° F. higher than the temperature of the semi-sweet gas 105. In one aspect, within the second contact zone 155, the stream of wash water 153 flows downward counter-currently contacting the semi-sweet gas 105 fed into the bottom portion of the second contact zone 155 as it travels in the upward direction, absorbing both ammonia and H$_2$S from the semi-sweet gas 105. In one embodiment, the second contact zone produces a sweet gas 157 and a rich water wash stream 163.

In one embodiment, ammonia 159 may be added to the second contact zone 155 at or above the bottom portion of the second contact zone 155 to facilitate the removal of H$_2$S from the semi-sweet gas 105. In one or more embodiments, the amount of ammonia added may be adjusted in response to the measured concentration of the H$_2$S exiting the second contact zone 155 or on the basis of the measured pH of liquid in the second contact zone 155.

In another embodiment, the total amount of ammonia added (135, 104 and 159) to the first contact zone 107 and the second contact zone 155 is less than one mole of ammonia per mole of hydrogen sulfide removed from the feed gas in the first contact zone 107 and the second contact zone 155. In a further embodiment, the concentration of H$_2$S in the sweet gas 105 may be maintained below 100 parts per million with total ammonia addition as streams 135, 104, and 159 being less than the molar rate of H$_2$S removed from the feed gas.

In one aspect, the sweet gas 157 may contain a reduced concentration of H$_2$S compared to the sour gas feed. Further, the sweet gas may contain a negligible concentration of ammonia. In one embodiment, the sweet gas 157 may be used in other process plant operations including, but not limited to, as fuel gas in fired heaters.

In embodiment, the rich water wash stream 163 produced by the second contact zone 155 is a dilute solution comprising ammonia and H$_2$S. In one aspect, it may be combined with the aqueous scrubbing liquid stream 101 in the first contact zone 107 or it may be fed directly to the sour water stripper 143. In one or more embodiments, the rich water wash stream 163, whether fed directly to the sour water stripper or mixed with the reflux recycle, is stripped in the sour water stripper 143 that processes sour water 137 from conventional sources in the facility, obviating a separate stripping system.

Figure 3:
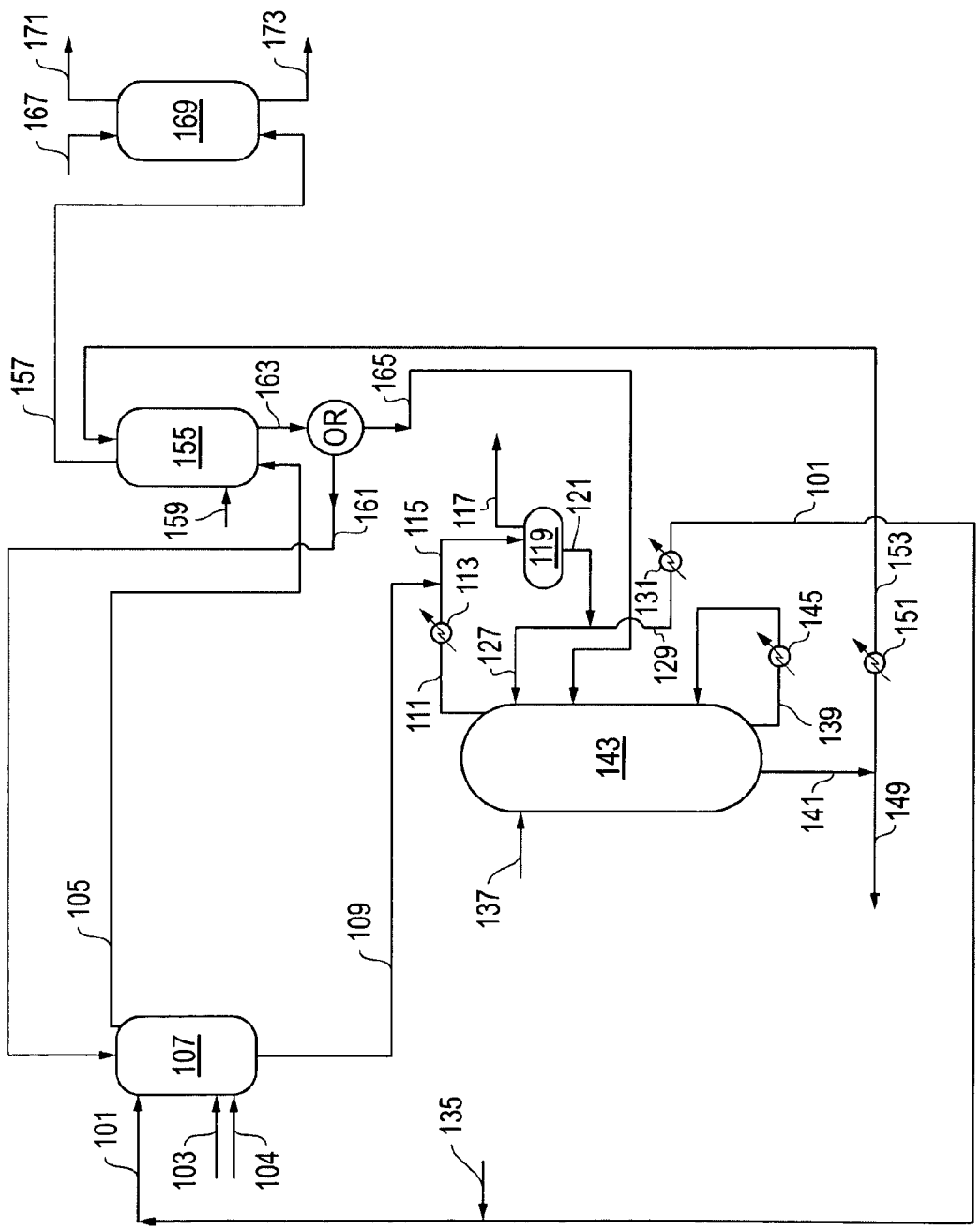
FIG. 3 is a schematic diagram of a further embodiment of the process.

As shown in FIG. 3, in an additional embodiment, the sweet gas 157 may be fed to a third contact zone 169 to further reduce the concentrations of ammonia and hydrogen sulfide in the sweet gas 157 by contacting the sweet gas 157 with a solution 167 fed to the third contact zone 169. In yet another embodiment, the reaction between the sweet gas 157 and the solution 167 creates a gas product 171 and a liquid product 173. Here, the gas product 171 has lower concentrations of H$_2$S and ammonia than the sweet gas 157. In one specific, non-limiting embodiment, the concentrations of ammonia and H$_2$S in the sweet gas 157 are reduced to less than 10 ppm. In another embodiment, the solution 167 comprises ammonium sulfite and ammonium bisulfite. When the solution 167 contacts the sweet gas 157, the solution absorbs most of the remaining hydrogen sulfide and converts it, by reaction with sulfite and bisulfite ions, to thiosulfate ions (S$_2$O$_3^{-2}$). The sulfite and bisulfite ions in the liquid buffer the pH of the solution so that the small amount of ammonia in the sweet gas 157 which was not removed in the second contact zone 155 is readily absorbed.

In this embodiment, the liquid product 173 comprises ammonium thiosulfate and ammonium sulfite where the amount of ammonia is greater then the amount of ammonia in the solution 167 and the amount of sulfite is less than the amount of sulfite in the solution 167 entering the upper portion of the third contact zone 169. In another embodiment, stream 167 is a portion of recycle stream produced in a process for converting ammonia and H$_2$S into ammonium thiosulfate and the liquid product 173 is returned to that process. The ammonium thiosulfate from that process is an article of commerce, used primarily as a fertilizer.

In the various embodiments of the invention, the concentration of hydrogen sulfide may be measured by an infrared analyzer device, chromatograph, or other suitable means.

The following example was calculated in PRO/II simulation using electrolyte thermodynamics:

A refinery produces 26,200 lb/h of sour water that carries about 79 lb/h of H$_2$S and 34 lb/h of ammonia in solution to the sour water stripper. The sour gas produced by the refinery contains about 811 lb/h of H$_2$S and 94 lb/h of carbon dioxide. The sour gas is contacted in a first contact zone with about 22,100 lb/hr of cooled liquid from the reflux drum of the sour water stripper and then in a second contact zone with 7,200 lb/h of cooled stripped water from the sour water stripper bottom, producing a desulfurized gas stream containing about 10 ppm NH$_3$ and 1 ppm H$_2$S. The rich water from the second contact zone is mixed with the reflux recycle liquid to the first contact zone. Rich liquid from the first contact zone is preheated by heat exchange with both the recycled liquid from the reflux drum and with the recycled stripped water and mixed with the stripper condenser effluent. The temperature of the mixture entering the reflux drum is controlled at 180° F. by adjusting heat removal from the condenser. Ammonia is added to the second contact zone at 102 lb/h and to the reflux drum at 278 lb/h, in total a molar ratio of 0.95 to the H$_2$S removed from the sour feed gas in this process. The sour water stripper gas comprises 378 lb/h of ammonia plus 859 lb/h of H$_2$S, a mol ratio of 0.88 ammonia/H$_2$S.

While the foregoing is directed to embodiments of the present invention, other and further embodiments of the invention may be devised without departing from the basic scope thereof and the scope thereof is determined by the claims that follow. The inventions are not limited to the described embodiments, versions or examples, which are included to enable a person having ordinary skill in the art to make and use the inventions when the information in this patent is combined with available information and technology.

What is claimed is:

1. A process for reducing the concentration of $H_2S$ in a feed gas stream comprising:
   contacting in a first contact zone the feed gas with a recycled aqueous scrubbing liquid comprising cooled liquid from a reflux drum of a sour water stripper, the cooled liquid comprising aqueous ammonia and hydrogen sulfide, producing a semi-sweet gas stream with a lower concentration of $H_2S$ than the feed gas and a rich liquid solution;
   mixing the rich liquid solution with overhead vapor from a sour water stripper, creating a mixture;
   controlling the temperature of the mixture to prevent condensation of ammonium bisulfide;
   separating the mixture in the reflux drum, to produce a vapor product stream and a flashed liquid;
   releasing the vapor product stream from the reflux drum;
   passing a portion of the flashed liquid to a means of cooling to reproduce the recycled aqueous scrubbing liquid; and
   returning a portion of the flashed liquid to the sour water stripper as reflux.

2. The process of claim 1, wherein the feed gas stream further comprises carbon dioxide.

3. The process of claim 1, wherein controlling the temperature of the mixture further comprises adjusting the rate of heat removed from the overhead vapor prior to mixing with the rich liquid.

4. The process of claim 1, wherein controlling the temperature of the mixture comprises adjusting the temperature of the rich liquid prior to mixing with the overhead vapor.

5. The process of claim 1, further comprising adding ammonia to the first contact zone or to the recycled aqueous scrubbing liquid before it enters the first contact zone.

6. The process of claim 5, further comprising adjusting the rate of adding ammonia according to the pH of liquid in the recycled aqueous scrubbing liquid.

7. The process of claim 5, further comprising adjusting the rate of ammonia addition according to the ratio of the concentrations of ammonia to hydrogen sulfide in the vapor product stream.

8. The process of claim 5, further comprising:
   measuring the concentration of hydrogen sulfide in the semi-sweet gas; and
   adjusting the flow rate of ammonia added to the first contact zone or to the recycled aqueous scrubbing liquid in response to the measured concentration of hydrogen sulfide.

9. The process of claim 1, further comprising:
   contacting the semi-sweet gas with wash water in a second contact zone, producing a sweet gas with reduced concentration of $H_2S$ compared to the semi-sweet gas and a rich water wash stream.

10. The process of claim 9, wherein the wash water is stripped sour water from the sour water stripper.

11. The process of claim 9, wherein ammonia is added to the second contact zone.

12. The process of claim 11, further comprising adjusting the rate of ammonia addition according to the pH of liquid in the second contact zone.

13. The process of claim 11, further comprising:
   measuring the concentration of hydrogen sulfide in the sweet gas; and
   adjusting the rate of addition of the ammonia to the second contact zone in response to the concentration of hydrogen sulfide.

14. The process of claim 11, wherein the total amount of ammonia added to the first contact zone and added to the second contact zone is less than one mole of ammonia per mole of hydrogen sulfide removed from the feed gas in the first contact zone and the second contact zone.

15. The process of claim 14, further comprising maintaining a concentration of hydrogen sulfide in the sweet gas of less than 100 parts per million.

16. The process of claim 9, wherein the rich water wash stream is fed to the first contact zone.

17. The process of claim 9, wherein the rich water wash stream is fed to the sour water stripper.

18. The process of claim 9, further comprising controlling the temperature of the wash water to maintain it to be a temperature within a range from 0 to 30° F. higher than the temperature of the semi sweet gas from the first contact zone.

19. The process of claim 9, further comprising:
   contacting the sweet gas with a solution comprising ammonium sulfite and ammonium thiosulfate in a third contact zone to reduce the concentrations of hydrogen sulfide and ammonia in the sweet gas.

20. A process for reducing the concentration of $H_2S$ in a feed gas stream comprising:
   contacting the feed gas with a recycled aqueous scrubbing solution comprising cooled liquid from a reflux drum of a sour water stripper, producing a semi-sweet gas stream with a lower concentration of $H_2S$ than in the feed gas and a rich liquid solution;
   mixing the rich liquid solution with overhead vapor of a sour water stripper containing ammonia, thereby creating a mixture;
   controlling the temperature of the mixture to prevent condensation of ammonium containing compounds within the mixture by adjusting the rate of heat removed from the overhead vapor prior to combining it with the rich liquid;
   passing the mixture into the reflux drum, producing a vapor and a flashed liquid wherein the vapor exits the reflux drum;
   splitting the flashed liquid to reproduce the recycled aqueous scrubbing solution and a sour water reflux stream;
   feeding the sour water reflux stream into the sour water stripper;
   cooling the recycled aqueous scrubbing solution before contacting it with the feed gas in a first contact zone;
   contacting the semi sweet gas with ammonia from an ammonia stream and wash water in a second contact zone thereby producing a sweet gas and a dilute rich water wash stream, wherein the wash water is a product of the sour water stripper;
   adjusting the rate of ammonia addition to the second contact zone according to the pH of the liquid in the second contact zone;
   controlling the amount of ammonia added to the first contact zone and added to the second contact zone to less than one mole of ammonia per mole of hydrogen sulfide removed from the feed gas in the first contact zone and the second contact zone; and feeding the rich water wash stream into the first contact zone;

controlling the temperature of the wash water product of the sour water stripper to remain at or above the temperature of the semi-sweet gas from the first contact zone.

21. The process of claim 20, further comprising:

contacting the sweet gas with a solution comprising ammonium sulfite and ammonium thiosulfate in a third contact zone to reduce the concentrations of hydrogen sulfide and ammonia in the sweet gas.

* * * * *